(No Model.)

D. LIVINGSTON.
POTATO DIGGER.

No. 478,442. Patented July 5, 1892.

WITNESSES:
J. A. Criswell.
C. Sedgwick

INVENTOR:
D. Livingston
BY Munn & Co
ATTORNEYS

United States Patent Office.

DAVID LIVINGSTON, OF THORNVILLE, OHIO.

POTATO-DIGGER.

SPECIFICATION forming part of Letters Patent No. 478,442, dated July 5, 1892.

Application filed December 30, 1891. Serial No. 416,518. (No model.)

*To all whom it may concern:*

Be it known that I, DAVID LIVINGSTON, of Thornville, in the county of Perry and State of Ohio, have invented a new and useful Improvement in Potato-Diggers, of which the following is a full, clear, and exact description.

My invention relates to an improvement in potato-diggers, and has for its object to provide an implement of simple, durable, and economic construction which will effectively remove potatoes from the ground without injury thereto and which will also prevent the potatoes when dug from being covered by brush or soil.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
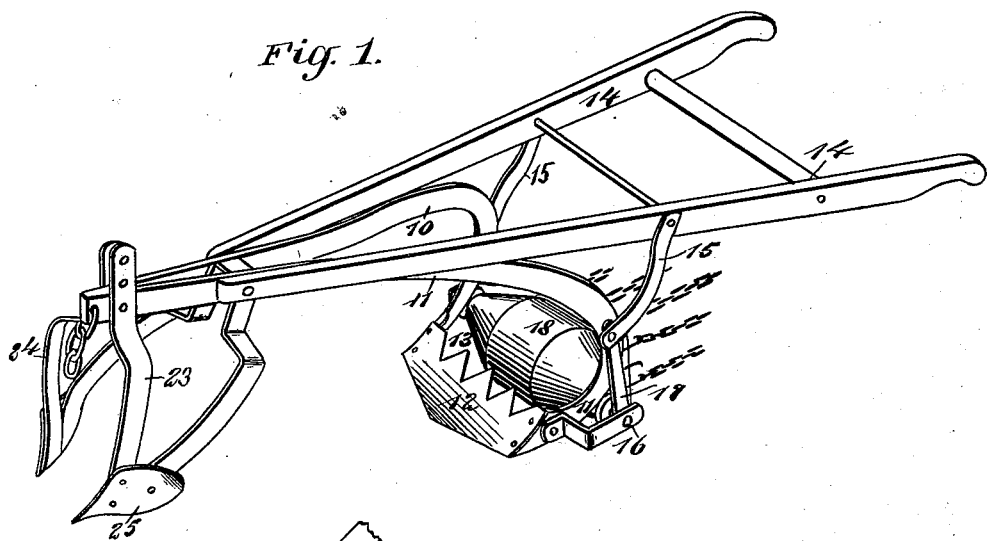
Figure 2:
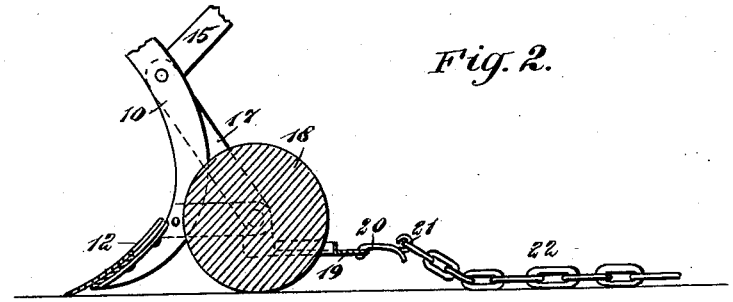
Figure 3:
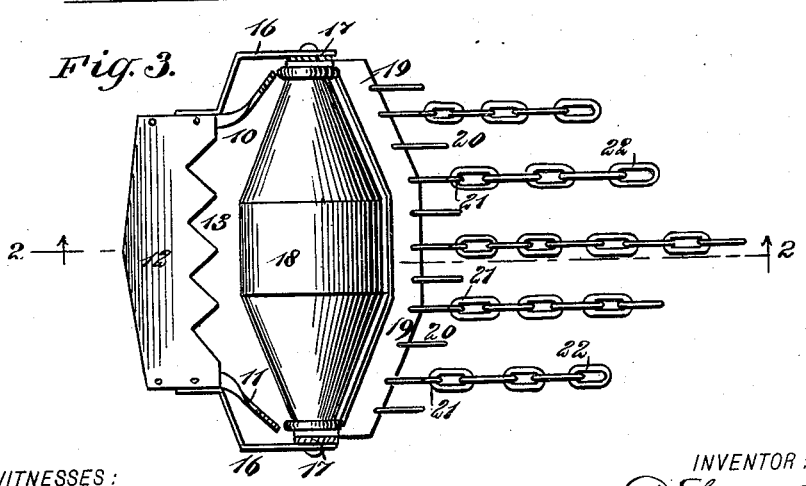

Figure 1 is a perspective view of the digger. Fig. 2 is a vertical section taken through the shovel and the roller, the said section being taken practically on the line 2 2 of Fig. 3; and Fig. 3 is a plan view of the shovel, the roller, and the drag.

In carrying out the invention two shanks 10 and 11, constructed of metal, are provided, the said shanks being united at their forward ends, from which point they extend horizontally in opposite directions, and their lower ends are curved downward in such a manner as to bring their lower extremities horizontally parallel. Upon the lower extremities of these shanks a shovel 12 is located. This shovel is concaved upon its forward face and pointed at the center of its lower edge, the said edge being beveled upward from the point in direction of its ends and the upper edge of the shovel is provided with a series of teeth 13. The shovel is so located upon the shanks 10 and 11 that its pitch is at an angle of forty-five degrees to a vertical line, and at this pitch the shovel may be most effectively used.

To the upper portions of the shanks 10 and 11 the handles 14 of the implement are attached. These handles approximate in form a plow-handle, and the handles are also connected by means of braces 15 with the lower portions of the shanks. Angular brackets 16 are rearwardly projected from the lower extremity of each of the shanks, and these brackets at their rear ends are supported by brace-bars 17, connected therewith and also connected with the shank. In these brackets at the rear of the shovel a roller 18 is journaled in such a manner as to prevent it from coming in engagement with the ground being turned up. This roller is circular in cross-section at its center and from a point each side of the center it is conical in shape, tapering in direction of its ends. The rear of the roller is surrounded by a guard 19, the forward edge of which is upturned or is made thin or sharpened in any approved manner to keep the roller free from soil, and rearwardly from this guard a series of horizontal arms 20 is projected, each alternate arm being provided with a hook 21 or the equivalent thereof for the reception of drag-chains 22, the center chain of which is the longest, the other chains being graduated in length, the shortest chains being at the ends of the guards. At the front of the shanks two vertically-disposed shanks 23 and 24 are located, the said shanks being curved outward in opposite direction, and each shank is provided with an attached share 25, adapted to turn up the ground. The shares 25 will fill the dead furrows between the rows, will regulate their entire depth and that of the shovel, and will lessen to a great extent the amount of earth that would otherwise pass between the shanks 10 and 11—a most desirable result. Besides the forward plows 25 also serve to cultivate the land for seeding purposes.

With reference to the shovel, it is a complete digger and clears itself in all kinds of soil and under all conditions—wet, dry, and weedy. Its pitch and point and its set and shape enable the operator to cut off weeds and tops and roots as he could not possibly do with a sharp-pointed shovel more horizontally set to the surface. The shovel lifts the potatoes with the dirt directly upward without massing the dirt together, but rather tends to loosen the dirt, the operation being substantially that of lifting a hill upon a spading-fork. Further, the shovel leaves a broad shallow furrow, and will dig up no more dirt than is absolutely necessary.

With reference to the roller, while some of the fine earth removed by the shovel will pass between the shovel and the roller, yet that on the sides of the hilling up to the rows containing the least potatoes passes quickly over the smaller portions of the roller, and is turned slightly outward in its fall to the ground, landing the potatoes on the top edge of the furrow made by the shovel, while the dirt, with almost all of the potatoes in it, lifts and loosens as it passes up over the central portion of the roller much more slowly than over the end portions, and this dirt, carried over the central portion of the roller, is thrown in all directions upon the rods 20 at the rear of the roller, whereby the potatoes are scattered in the broad shallow furrow and lie convenient for the pickers to gather. The drag-chains at the back and likewise the arms 20 serve to sift the dirt from the potatoes when dug and delivered at the back of the digger, and the chains also act to remove rubbish or dirt from the potatoes as they lie upon the ground.

The roller 18 may be made of wood, hollow or solid, or of iron rods or bars laid upon a suitable frame lengthwise, or the bars may be placed diametrically and shaped as rings. In fact, the roller may be of any suitable or approved construction, but the shape illustrated is at all times preferred.

Having thus described my invention, I claim as new and desire to secure by Letters Patent—

1. In a potato-digger, the combination, with a shovel, of a roller located directly at the rear of the shovel and parallel therewith, the said roller being provided with a circular central surface and tapering ends, substantially as shown and described.

2. In a potato-digger, the combination, with a shovel and supports maintaining said shovel at an angle of about forty-five degrees to the ground, of a roller held to revolve directly at the rear of the shovel and parallel therewith, the central portion of which is circular and the end portions tapering or conical in cross-section, as and for the purpose specified.

3. In a potato-digger, the combination, with a shovel provided with a central point at its lower or cutting surface, the said surface at each side of the point being beveled in opposite directions, and supports maintaining the shovel at an angle of about forty-five degrees to the ground, of a roller located directly at the rear of the shovel and parallel therewith, the roller being cylindrical at its central portion and tapering at its extremities, substantially as shown and described.

4. In a potato-digger, the combination, with a shovel the cutting-edge whereof tapers from the center in opposite directions, the face of the shovel being concaved and its upper edge provided with teeth, and a support maintaining the shovel at an angle to the ground over which it is to pass, of a roller held to revolve at the rear of the shovel, said roller being cylindrical at its central portion and tapering at its extremities, a guard surrounding the rear portion of the roller, arms projected from the guard, and drag-chains carried by sundry of the arms, substantially as and for the purpose specified.

5. In a potato-digger, the combination, with a shovel the cutting-edge of which is beveled in opposite directions from its center, the said shovel being provided with a transversely-concaved forward face and teeth produced at its outer edge, and a support maintaining the shovel at an angle of about forty-five degrees to the ground, of plow-shanks attached to the support projected outward and downward in opposite directions and having shares attached thereto, the said plow-shanks being located in front of the shovel, a roller held to revolve at the rear of the shovel, the central surface of which is cylindric and its extremities tapering, a guard located adjacent to the rear surface of the roller, arms horizontally projected from the guard, and drag-chains attached to sundry of the arms, as and for the purpose specified.

DAVID LIVINGSTON.

Witnesses:
H. SMEAD,
A. L. PARKER.